United States Patent [19]

Patel

[11] Patent Number: 5,467,460
[45] Date of Patent: Nov. 14, 1995

[54] M&A FOR MINIMIZING DATA TRANSFER TO MAIN MEMORY FROM A WRITEBACK CACHE DURING A CACHE MISS

[75] Inventor: Piyush G. Patel, Fremont, Calif.

[73] Assignee: Intel Corporation, Santa Clara, Calif.

[21] Appl. No.: 234,587

[22] Filed: Apr. 28, 1994

Related U.S. Application Data

[63] Continuation of Ser. No. 28,724, Mar. 8, 1993, abandoned, which is a continuation of Ser. No. 479,628, Feb. 14, 1990, abandoned.

[51] Int. Cl.⁶ .............................. G06F 12/08; G06F 13/00
[52] U.S. Cl. .................. 395/70; 364/243.4; 364/243.41; 364/238.4; 364/245.1; 364/252.5; 364/964.2; 364/958.2
[58] Field of Search .......................... 364/DIG. 1, DIG. 2

[56] References Cited

U.S. PATENT DOCUMENTS

| | | | |
|---|---|---|---|
| 4,229,789 | 10/1980 | Morgan et al. | 364/200 |
| 4,272,828 | 6/1981 | Negi et al. | 364/900 |
| 4,290,103 | 9/1981 | Hattori | 364/200 |
| 4,298,929 | 11/1981 | Chpozzi | 364/200 |
| 4,381,541 | 4/1983 | Baumann, Jr. et al. | 364/200 |
| 4,604,695 | 8/1986 | Widen et al. | 364/200 |
| 4,608,671 | 8/1986 | Shimizu et al. | 365/230 |
| 4,685,082 | 8/1987 | Cheung et al. | 365/49 |
| 4,713,755 | 12/1987 | Worley, Jr. et al. | 364/200 |
| 4,719,568 | 1/1988 | Carrubba et al. | 364/200 |
| 4,742,454 | 5/1988 | Robinson et al. | 364/200 |
| 4,774,654 | 9/1988 | Pomerene et al. | 364/200 |
| 4,811,203 | 3/1989 | Hamstra | 364/200 |
| 4,811,209 | 3/1989 | Rubinstein | 364/200 |
| 4,858,111 | 8/1989 | Steps | 364/200 |
| 4,860,192 | 8/1989 | Sachs et al. | 364/200 |
| 4,881,163 | 11/1989 | Thomas et al. | 364/200 |
| 4,910,656 | 3/1990 | Schles, III et al. | 364/200 |
| 4,928,239 | 5/1990 | Baum et al. | 364/200 |
| 4,933,835 | 6/1990 | Sachs et al. | 364/200 |
| 4,942,518 | 7/1990 | Weatherford et al. | 364/200 |
| 4,945,512 | 7/1990 | Dekhrske et al. | 365/49 |
| 4,975,873 | 12/1990 | Nakabayashi et al. | 365/49 |
| 4,985,829 | 1/1991 | Thatte et al. | 364/200 |
| 4,996,641 | 2/1991 | Talgam et al. | 364/200 |
| 5,155,824 | 10/1993 | Edenfield et al. | 364/DIG. 1 |
| 5,185,878 | 2/1993 | Barar et al. | 364/DIG. 1 |

Primary Examiner—Kevin A. Kriess
Assistant Examiner—Lucien U. Toplu
Attorney, Agent, or Firm—Blakely, Sokoloff, Taylor & Zafman

[57] ABSTRACT

A cache memory having at least two modified bits for each block of data coupled to a WriteBack buffer circuit is described for transferring a fraction of the data block when a cache miss occurs. In the preferred embodiment of the present invention, the data array of the data cache is partitioned into two halves, each block of data has two modified bits. When a cache miss occurs, a replacement algorithm determines which of the lines in a given set shall be replaced. The contents of the chosen line in the data cache is written, copied to a WriteBack buffer circuit. The line of data from external memory is then written into the data cache, clearing the two modified bits in the data cache in the process. If only one modified bit is set, only half of a block of data is written back into the data cache. Thus, the present invention minimizes the data transfer from a data cache during a cache miss by transferring only half a block of data when the required data from the external memory is less than half of a block of data in length.

4 Claims, 4 Drawing Sheets

M&A FOR MINIMIZING DATA TRANSFER TO MAIN MEMORY FROM A WRITEBACK CACHE DURING A CACHE MISS

This is a continuation of application Ser. No. 08/028,724, filed Mar. 8, 1993, which is a continuation of application Ser. No. 07/479,628, filed Feb. 14, 1990 now both abandoned.

BACKGROUND OF THE INVENTION

1. Field of the Invention

The present invention relates to semiconductor memories, and in particular to a circuit and modified bits for minimizing the data transfer from a cache memory during a cache miss.

2. Art Background

It is quite common in the computer industry to enhance the speed of the processor in achieving higher over-all performance of a computer system. Recently, wider data bus has been used to improve the transfer of data between semiconductor memories and high-speed processors. Following this trend, designers of high performance computer systems have incorporated instruction pipelines into the architecture of the processors. More recently, caches have been used to further reduce the amount of time a processor takes to retrieve the data or instructions from external memory. A cache is a small but fast memory that stores the most frequently used data or instructions of a computer system. In general, the processor is able to retrieve data from the cache about 80 to 90% (cache hit) without fetching the same from the slower external memory. If a data is not found on the cache (cache miss), the processor will retrieve the data from the slower external memory.

Notwithstanding advances in the various techniques to improve the speed of a processor, the growing bus traffic is becoming the bottleneck in high performance computer systems. To reduce the bus traffic is therefore a key to improving the overall performance of a high speed computer system.

During a cache miss, blocks of data from the cache are transferred out of the cache and written with the needed data blocks from the external memory. A block of data from a data cache consists of at least a line of data. Because a line of data may further comprise at least 16 bytes or up to 64 bytes of data, the reading and writing of such blocks of data contribute to the bus traffic.

It is therefore an object of the present invention to minimize the data transfer from a cache memory during a cache miss.

It is another object of the present invention to transfer a fraction of a block of data from a cache memory during a cache miss.

It is yet another object of the present invention to transfer a fraction of the data block from a cache memory during a cache miss while minimizing the hardware overhead.

SUMMARY OF THE INVENTION

A cache memory having at least two modified bits for each block of data coupled to a WriteBack buffer circuit is described for transferring a fraction of the data block when a cache miss occurs. In the preferred embodiment of the present invention, the data array of the data cache is partitioned into two halves, each block of data has two modified bits. When a cache miss occurs, a replacement algorithm determines which of the lines in a given set shall be replaced. The contents of the chosen line in the data cache is written, copied to a WriteBack buffer circuit. The line of data from external memory is then written into the data cache, clearing the two modified bits in the data cache in the process. If only one modify bit is set, only half of a block of data is written back into the data cache. Thus, the present invention minimizes the data transfer from a data cache during a cache miss by transferring only half a block of data when the required data from the external memory is less than half of a block of data in length.

DETAILED DESCRIPTION OF THE INVENTION

A semiconductor memory having two modified bits for each line of data coupled to a WriteBack buffer circuit is described. In the following description, numerous specific details are set forth such as specific gates, logic flow charts, etc. in order to provide a thorough understanding of the present invention. It will be obvious to one skilled in the art that the present invention may be practiced without these specific details. In other instances, well-known circuits have been shown in symbolic form in order not to obscure the present invention in unnecessary detail.

Figure 2:
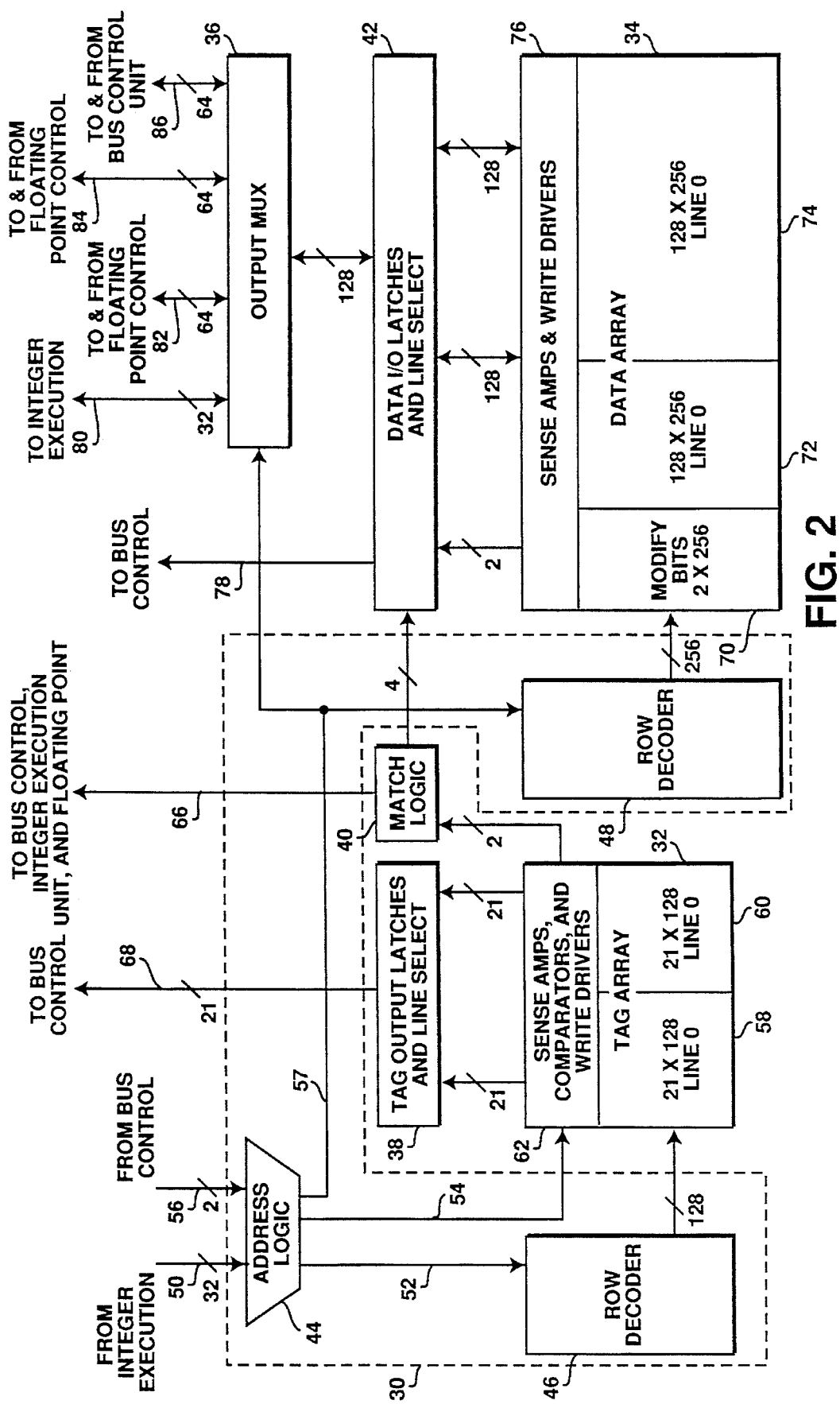
FIG. 2 is a block diagram of the data cache used in the preferred embodiment of the present invention.

The present invention is realized with metal-oxide-semiconductor (MOS) technology. As currently implemented, the present invention is used as part of a cache memory where the memory arrays in the cache memory are ordinary static random access memories (SRAM). These arrays are shown in FIG. 2. It will be obvious that the present invention can be used in other memories. The entire memory with the WriteBack buffer circuit of the present invention is fabricated as an integrated circuit on the same substrate or die. This takes advantage of the fact that the process variations do not vary substantially over a single die. Hence, the characteristic of the device in the cache memory and that of the WriteBack buffer circuit will be known relative to the characteristic of the devices in the memory array for a given die.

GENERAL SYSTEM CONFIGURATION

Figure 1:
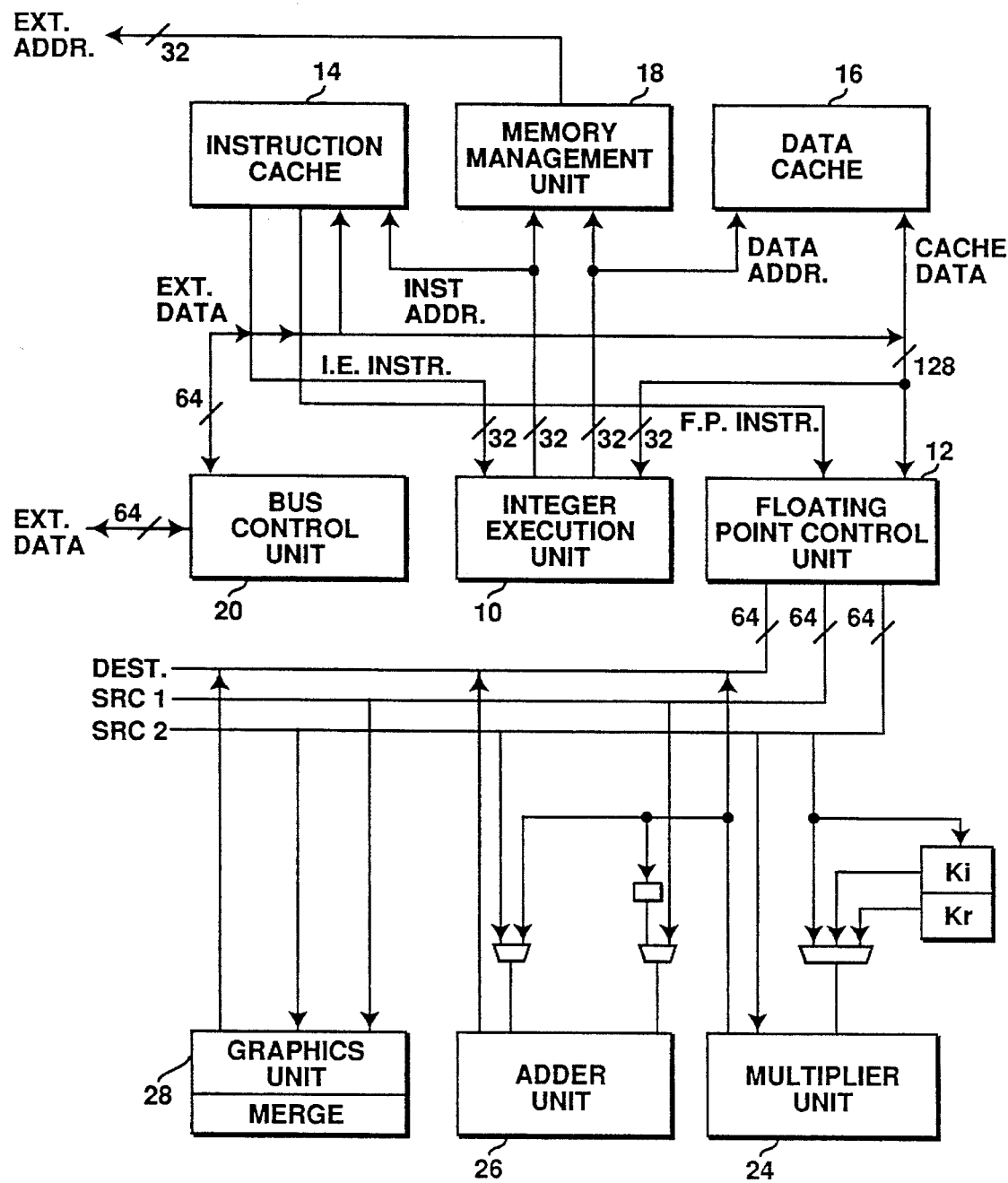
FIG. 1 is a block diagram of a high-speed processor featuring a data cache coupled to a bus control unit and integer execution unit and a floating point control unit.

FIG. 1 shows a typical processor for processing and manipulating data and machine based instructions according to the present invention. Shown there is an integer execution unit 10 coupled to a floating point control unit 12 for fetching and executing integer and floating point instructions and other arithmetic and logical operations. The integer execution unit 10 and the floating point control unit 12 are further coupled to an instruction cache 14 and a data cache 16 for receiving instructions and data therefrom. Typically, in modern day processors, the integer execution unit is also coupled to a memory management unit 18 for transferring the addresses for the processed data. A bus control unit 20 is coupled to the instruction cache 14 and the data cache 16 as well as the floating point control unit 12 for transferring external data among the aforementioned units. More recently, the floating point control unit is also coupled to a multiplier unit 24, and adder unit 26, and increasingly so to a graphics unit 28. Together, the above system is typically found in most general purpose computers, inside a microprocessor, and in most all special purpose computers.

FIG. 2 is a block diagram of a data cache suitable for use in a high speed processor. The data cache 16 comprises a control logic 30, a tag array 32, a data army 34, and an output data multiplexer 36. The control logic 30 is coupled to the tag army 32 and the data array 34 for latching address and data input thereto, and reading thereto, and writing therefrom. The tag array 32 stores the tag addresses of the data loaded in the data array 34 and performs tag look-up and tag compares. The data array 34 contains data for the data cache 16 during a read cycle. The data array 34 outputs its data onto the floating point control unit 12. During a write cycle, the data array accepts its input data from the floating point control unit 12.

In the prior art, blocks of data are transferred into and out of the data array 34. A block of data from the data array comprises a plurality of lines of data. In the preferred embodiment of the present invention, each block of data comprises at least two lines, line 0 and line 1. When a cache miss occurs, an entire block of data, including line 0 and line 1 would be transferred out of the data array 34 and a new block of data from the external memory will be written into the data array even though the data sought by the processor is either exclusively in line 0 or line 1. As will be described below, the present invention transfers only one half of a data block upon a cache miss if the data sought by the processor resides exclusively in either one half of such a data block.

PREFERRED EMBODIMENT OF THE PRESENT INVENTION

Referring again to FIG. 2, the preferred embodiment of the present invention features a control logic 30, a tag array 32, a data array 34 and an output multiplexer 36. The control logic 30 comprises address logic 44, tag row decoder 46, and data row decoder 48. The address logic 44 is coupled to the integer execution unit 10 over line 50 for receiving signals to form the tag comparator address and tag and data array row addresses. The address for tag array 32 is the formed when the address logic 44 latches the address signal from the integer execution unit 10 over line 50 and further latches into the tag array 32 over lines 52 and 54. The address for the data army 34 is formed when address logic 44 latches the address signal from the bus control unit 20 over line 56 and further latches into the data row decoder 48 over line 57.

The tag army 32 comprises SRAM army having 42 columns by 128 rows. In the preferred embodiment of the present invention, the tag array 32 holds the two 21-bit tag addresses for each of the 128 sets in the data cache 16. Thus, the tag army 32 further comprises two tag address fields 58 and 60, respectively. The 42 bit line pairs further feed into an array of comparators 62. The comparator array 62 comprises 42 comparators, 21 for each line in the set. The comparator array 62 is further coupled to the bus control unit 20, the integer execution unit 10, and the floating point control unit 12 over a match logic 40 and over line 66. The match logic 40 announces the result of a cache hit to the integer execution unit 10, the floating point control unit 12, and the bus control unit 20. The tag array 32 is further coupled to an output latch 38 for notifying the bus control unit of the tag address bin replaced during a WriteBack cycle. The details of a WriteBack cycle will be described fully below.

The data array comprises SRAM array separated into two planes, 72 and 74, respectively and contain 256 columns by 256 rows. Each set occupies two wordlines, allowing two lines of 32 bytes each per set. The data array also contains two columns of resetable SRAM bits which serve as the modified bits 70. Each line of each set has two modified bits, one for the upper 16 bytes of the line and one for the lower 16 bytes. The modify bit 70 is coupled to the bus control unit 20 over line 78 for indicating whether the data line half 72 or 74 has been modified. The modify bit 70, together with the WriteBack buffer circuit in the output multiplexer 36 are the key elements of the present invention. The details of how the modify bit works with the WriteBack buffer circuit will be described further below. The 256 bit line pairs of the data array 34 further feed into an amplifier and a driver array 76. The array 76 comprises 256 send amplifiers, 128 for each line. During a read cycle of the data cache, the matched information from the tag army 32 determines which lines send data goes to the output latches 42 which is coupled to the data array 34. The output latches 42 drive the data operand to the floating point control unit 12 over the output multiplexer 36.

The output multiplexer 36 is coupled to the integer execution unit 10 over line 80 for transferring data between the data cache 16 and the integer execution unit 10. The output multiplexer 36 is further coupled to the bus control unit over a line 86 for transferring data between the bus control unit 20 and the data cache 16.

Figure 3:
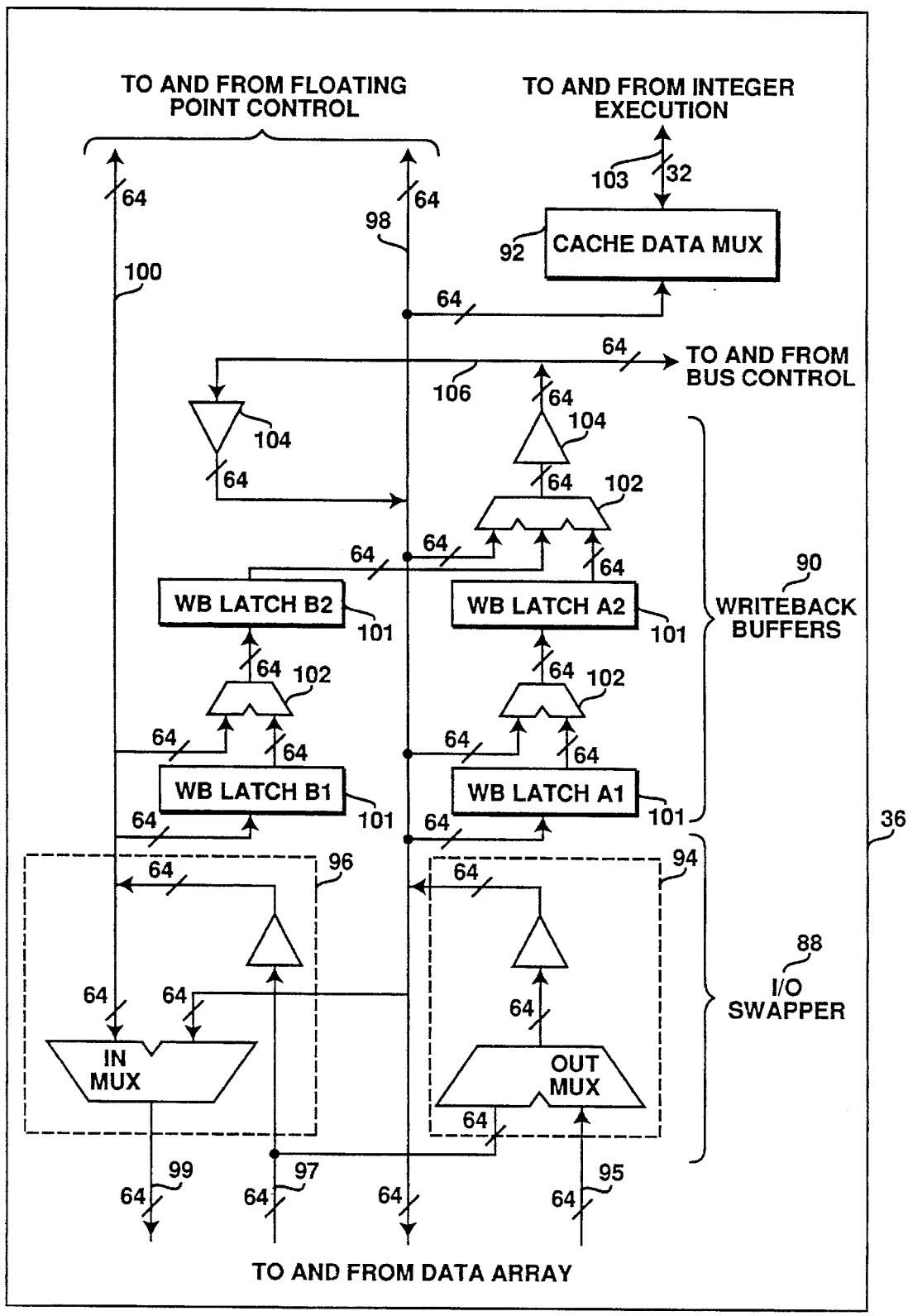
FIG. 3 is a circuit diagram of the output multiplexer used in the preferred embodiment of the present invention.

FIG. 3 is a circuit diagram of the output multiplexer 36 used in the preferred embodiment of the present invention. The data cache output multiplexer 36 comprises an I/O swapper 88, a WriteBack buffer 90, and a data cache multiplexer 92. The I/O swapper 88 further comprises output swapper 94 and input swapper 96, respectively. The output swapper 94 is coupled to the output data I/O latch 42 over lines 95 and 97, respectively. The output swapper 94 is further coupled to the internal bus 98 for latching either the high or low-order bits of the data array into the floating point control unit 12. The high-order bit of the data array set will be swapped onto the floating point control unit 12 except during a WriteBack cycle. The input swapper 96 is coupled to the floating point control unit 12 over internal bus 100. The input swapper 96 is further coupled to the output data I/O latch 42 over lines 99 and 97. The input swapper 96 determines whether the data on either internal bus 98 or internal bus 100 is latched into the input data latch 42. The internal bus 98 will be swapped into the high-order input latches during any cycle type which requires less than 128 bits of input data. As such, the upper and lower-order input latch will contain the same data, but only one half or the other half will be actually used during the data array write.

The internal bus 98 and 100 are coupled to the data I/O latches 42. The data I/O latches 42 are tri-state buffers. These output buffers drive the input and output data to and from the floating point control 12, irrespective of whether the output would be used. Coupled to the output buffers of the output data I/O latches 42 are the WriteBack buffers 90. The WriteBack buffers 90 are one or two deep FIFO which are capable of storing 256 bits (corresponding to a full line of data cache data). The WriteBack buffers 90 comprise a plurality of WriteBack latches 101 coupled to a plurality of multiplexers 102 and further coupled to inverters 104. The WriteBack buffers 90 are further coupled to the bus control unit 20 for receiving controlling signals therefrom. The WriteBack buffers are used primarily to hold a data cache line during a Replace cycle after a cache miss during the read cycle of the data cache 16. The WriteBack latches 101 are also used to hold write data after a cache miss during the write cycle. The details of how the WriteBack buffers 90 handle the Replace data cache lines and the new data cache lines from the external memory will be discussed in detail in sections below. Finally, the cache data multiplexer 92 is coupled to the internal bus 98 for transferring read and write data between the integer execution unit 10 and the data cache 16 over the line 103. It follows from the above that the WriteBack buffers 90, under the control of the bus control unit 20 is able to maintain a copy of the data cache line after a cache miss and swap the appropriate half of the same data cache line with the I/O swapper 88 before the Replace data cache line is written back into the external memory. As such, the modify bits of the data array 34 and the WriteBack buffers in the output multiplexer 36, in combination with the I/O swapper 88 is able to minimize the data transfer from a data cache during a cache miss.

Figure 4:
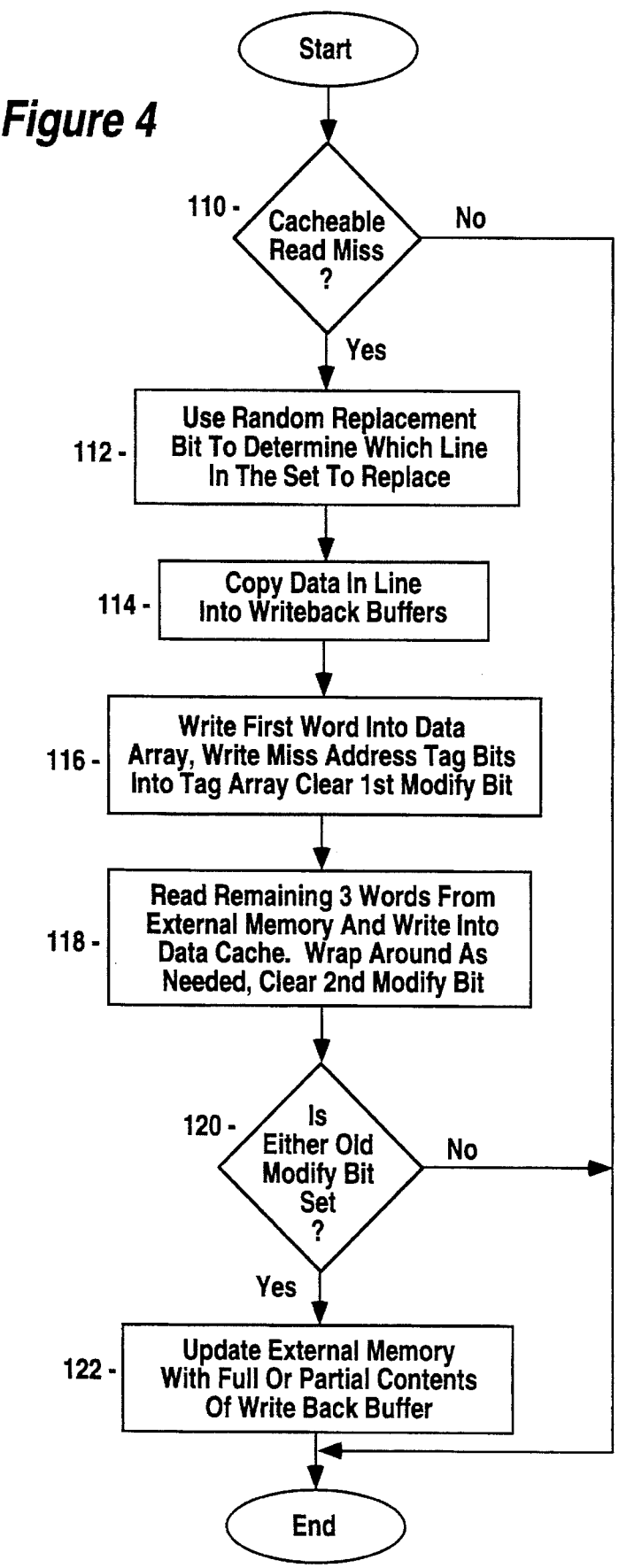
FIG. 4 is a flow diagram of a data transfer during a cache miss under the teachings of the present invention

To better illustrate the steps in reducing the number of data cache lines during a cache miss, FIG. 4 is a flow chart of the cache miss processing used in the preferred embodiment of the present invention. During a read cycle, both the tag array 32 and the data array 34 of the data cache 16 are read simultaneously. The stored tags for both lines in the selected set are compared against the requested tag address. If either matches, then a cache hit occurs. However, in the case of a cache miss, the address latches 38 freezes and cache miss processing begins in step 110. The data cache initiates two WriteBack cycles followed by the initiation by the bus control unit 20 of four Replace cycles to bring the requested data from the external memory into the data cache 16. In step 112, the bus control unit 20 determines which of the lines in a given set shall be replaced during cache miss processing. The line can be chosen at random or according to which was Least Recently Used (LRU). In the preferred embodiment of the present invention, the data cache uses random placement to choose which of the two lines in a given set shall be replaced during cache miss. Bit counter not shown in the description supplied by the bus control unit 20 is used to make the selection. The counter bit toggles every clock except during cache miss processing. In step 114, the data cache 16 initiates its two WriteBack cycles. WriteBack cycles allows the entire contents of a line selected in a given set to be transferred from the data array 34 to the WriteBack buffers 90 over the internal bus 98 and 100, respectively. In step 116, the bus control unit 20 starts the Replace cycle by writing the first word from external memory into the data cache line selected during the cache miss. Four Replace cycles are required to write 32 bytes in a line. At the same time, the tag address and set index which cause the cache miss is saved in the address latches 38 for use during the WriteBack and Replace cycles. In the process, the modify bit corresponding to the low-order half of the selected data cache line is cleared. In step 118, the Replace cycle initiated by the bus control unit 20 continues to read the remaining three words from the external memory and write into the selected data cache line. In the preferred embodiment of the present invention, wraparound loading is used for fetching external data. Data in this case is fetched externally on demand. Because a line of data contains 32 bytes, an external fetch and a line fill requires four 8-byte external memory reads. Using wraparound loading means that the external memory reads begin with the 8-byte word containing the address which generated the cache miss as illustrated in step 116. The external reads then continues at the high-order addresses until the end of the line is reached then wraparound to the beginning of the line, and then continue until the miss address is reached. The modify bit for the high-order of the select data line is also cleared in step 118. In step 120, the WriteBack cycles and the Replace cycles have been completed. The bus control unit 20 tests whether the previous modified bits have been set. If either of the previous modified bits have not been set, the bus control unit 20 does not update the external memory with any of the contents of the WriteBack buffer 90. Otherwise, in step 122, the bus control unit 20 updates the bus control unit 20 updates the external memory with full or partial contents of the WriteBack buffer 90 accordingly. As described in detail in FIG. 4, the WriteBack Buffer 90 outputs the entire line in a given set when the data precipitating a cachable read miss is longer than one half of the line. However, when the data precipitating the cachable read miss is shorter than one half of a line in a given set, only half of the line shall be written back into external memory. Thus, the present invention minimizes the data transfer from a data cache during a cache miss. It follows with the savings in the data transfer from a data cache, the bus traffic will be reduced to enhance the overall performance of a high speed computer system.

While the present invention has been particularly described with reference to FIGS. 1–4 and with emphasis on certain circuits and bits, it should be understood that the figures are for illustration only and should not be taken as limitations upon the invention. In addition, it is clear that the method and apparatus of the present invention has utility in any application where the use of an integer execution unit in a processor is required. It is contemplated that many changes and modifications may be made by one of ordinary skill in the art without departing from the spirit and scope of the invention as disclosed above.

What is claimed is:

1. An apparatus comprising:
   a main memory for storing data;
   a writeback cache memory having s sets of cache lines for caching a subset of the data stored in main memory, s being greater than one, each set having w cache line(s), w being equal to or greater than one, each cache line having a cache line size of n1 bytes, each cache line being also divided in to m cache line segments of n2 bytes, each cache line further having a single address tag for all m cache line segments, and m modify bits corresponding to the m cache line segments individually denoting whether the corresponding cache line segments have been modified, n1, n2 and m being non-zero integers with n1=m×n2, and n2 and m are both greater than one;
   a plurality of write buffers coupled to the cache memory for buffering at least one cache line of data evicted out of the cache memory to make room in the cache memory for incoming replacement data responsive to cache misses;
   a bus coupled to the write buffers and the main memory for transferring the buffered data to the main memory in quantities of n3 bytes at a time, n2 being an integer multiple of n3;
   a bus controller coupled to the write buffers for controlling conditional partial write back of the buffered data for only those cache line segments whose corresponding modify bits denote the cache line segments having been modified.

2. The apparatus as set forth in claim 1, wherein,
   s equals one hundred and twenty eight (128);

w equals two (2);

n1 equals thirty-two (32);

n2 equals sixteen (16);

m equals two (2); and n3 equals eight (8).

3. A computer system comprising:

a main memory for storing data;

a cache memory having s sets of cache lines for caching a subset of the data stored in the main memory, s being greater than one, each set having w cache line(s), w being greater than or equal to one, each cache line having a cache line size of n1 bytes, each cache line being also divided in to m cache line segments of n2 bytes, each cache line further having a single address tag for all m cache segments and m modify bits corresponding to the m cache line segments individually denoting whether the corresponding cache line segments have been modified, n1, n2 and m being non-zero integers with n1=m×n2, and n2 and m are both greater than one;

a plurality of write buffers coupled to the cache memory for buffering at least one cache line of data being evicted out of the cache memory to make room in the cache memory for incoming replacement data responsive to cache misses;

a bus coupled to the write buffers and the main memory for transferring the buffered data to the main memory in quantities of n3 bytes at a time, n2 being a greater than one integer multiple of n3;

a bus controller coupled to the write buffers for controlling conditional partial write back of the buffered data for only those cache line segments whose corresponding modify bits denote the cache line segments having been modified.

4. The computer system as set forth in claim 3, wherein, s equals one hundred and twenty eight (128);

w equals two (2);

n1 equals thirty-two (32);

n2 equals sixteen (16);

m equals two (2); and n3 equals eight (8).

* * * * *

UNITED STATES PATENT AND TRADEMARK OFFICE
CERTIFICATE OF CORRECTION

| | | |
|---|---|---|
| PATENT NO. | : | 5,467,460 |
| DATED | : | November 14, 1995 |
| INVENTOR(S) | : | Piyush G. Patel |

It is certified that error appears in the above-identified patent and that said Letters Patent is hereby corrected as shown below:

In column 3 at line 10 delete "army" and insert --array--

In column 3 at line 12 delete "army" and insert --array--

Signed and Sealed this

Fifteenth Day of July, 1997

*Attest:*

BRUCE LEHMAN

*Attesting Officer*  *Commissioner of Patents and Trademarks*